H. COALE.
PROCESS OF PACKAGING.
APPLICATION FILED MAR. 29, 1910.
989,337.
Patented Apr. 11, 1911.
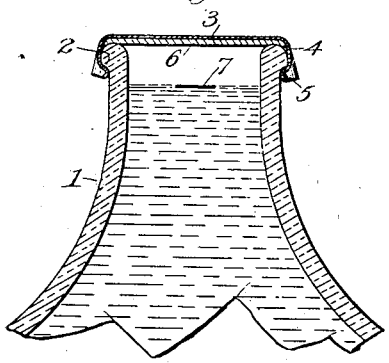
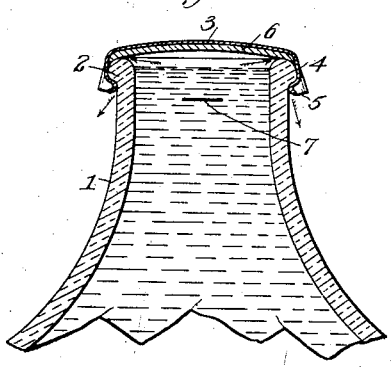
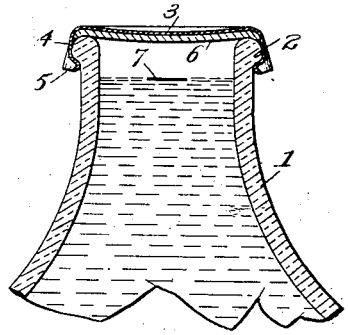
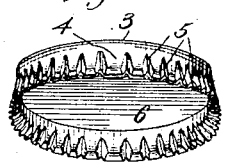
Witnesses:
A. M. Houghton
S. V. Caffrey
Inventor:
Henry Coale
by his Atty's
Philipp, Sawyer, Rice & Kennedy

UNITED STATES PATENT OFFICE.

HARVEY COALE, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

PROCESS OF PACKAGING.

989,337.

Specification of Letters Patent.  Patented Apr. 11, 1911.

Application filed March 29, 1910. Serial No. 552,150.

*To all whom it may concern:*

Be it known that I, HARVEY COALE, a citizen of the United States, residing at Baltimore city, State of Maryland, have invented certain new and useful Improvements in Processes of Packaging, fully described and represented in the following specification and the accompanying drawings, forming a part of the same.

This invention relates to an improved process of packaging milk and similar foods which are heated to destroy harmful bacteria.

In packaging foods of different kinds, such, for instance, as milk, which is heated to destroy harmful bacteria, it is customary to heat in a suitable receptacle of such capacity as to contain a considerable quantity of milk, the temperature being raised to the required degree to destroy the bacteria. In the treatment of milk, if it is desired to avoid breaking up the fatty globules in the milk, which breaking up prevents the rising of the cream, the temperature to which the milk is raised is about 160° F. In thus packaging milk, after it is heated in the receptacle referred to, it is placed in bottles or jars which have been previously sterilized by hot water or steam, the jars being then usually sealed by placing paper seals over the mouths of the jars, the seals being secured in place, if desired, by various means, such as by covering the disk with a foil capsule. This process is objectionable, because the milk is liable to take up harmful bacteria from the air during the transfer from the heating receptacle to the bottles or jars, and for the further reason that the bottles or jars, after the milk is placed in them, must be again handled to place the paper disks thereon. Further, the milk in the bottles or jars is not maintained *in vacuo*, so that there is liability of contamination, particularly if, as is usually the case, the milk is not raised during processing to above about 160° F. Other food products, such, for instance, as fruit and vegetables, are processed in the jars or receptacles in which they are marketed, the jars being placed in a vacuumizing receptacle, the covers either being placed loosely on the jars and then forced into place after processing and while the jars are still in the vacuumizing receptacle, or the covers are held above the jars by suitable devices, so that they may be forced upon the jars while still in the vacuumizing receptacle. This process enables the contents of the jars to be sealed and maintained *in vacuo* after processing, but requires considerable mechanism for its practice, unless the covers are loosely placed on the jars as referred to, in which case considerable difficulty is experienced in obtaining a good seal. For these and other reasons this process is not adapted for the packaging of milk and similar products. It has also been proposed to process jars or similar receptacles containing food by securing specially made covers to them prior to processing, these covers being usually of glass, by constructions involving the use of springs, such, for instance, as spring clips. The jars are subjected to heat which, of course, increases the pressure within the jar, causing the spring clips to yield so that the air escapes from the jar. As the receptacles cool, the springs draw the covers down into place on the mouth of the receptacle, thus closing the jars against the admission of air and maintaining the contents substantially *in vacuo*. Covers of the character referred to, as heretofore made, have been expensive and are not adapted for use in connection with packaging milk or other similar products, especially where it is desirable, for sanitary reasons, that the covers be thrown away.

The present invention has for its object the packaging of milk or other similar food products to be heated to destroy the harmful bacteria by placing the product in a suitable container, such as a jar, applying thereto a sheet metal closure which is inherently sufficiently flexible to yield to the pressures developed during heating and which is locked to the jar by being bent into engagement therewith, a substantially non-resilient sealing gasket being interposed between the top of the cap and the lip of the jar and being forced against the lip of the jar by the operation of locking the cap thereto to form a substantially hermetic seal, and subjecting the receptacle thus closed to heat to destroy bacteria and expel air from the jar, the inherent flexibility of the closure permitting it to yield sufficiently to allow the escape of air, but not sufficiently to break the lock by which it is attached, so that the seal is automatically reëstablished when the container and its contents are cooled.

As the improved process of packaging may well be described in connection with drawings showing a suitable container and closure for carrying the process into effect, a sheet of drawings illustrating such container and closure is made a part of this specification In these drawings—Figure 1 illustrates, in sectional elevation, a container and closure suitable for carrying the invention into effect, the closure being locked in place, this view illustrating the condition of the parts prior to the processing operation. Fig. 2 is a view similar to Fig. 1 but showing the relation of the parts during the processing operation. Fig. 3 illustrates the relation of the parts after the processing operation is completed, and the container and its contents are cooled. Fig. 4 illustrates, in perspective, a closure suitable for carrying the invention into effect.

Referring to these drawings, 1 indicates a suitable container for carrying the invention into effect, the container illustrated being the ordinary milk jar provided with a bead or shoulder 2 at its top. The container has applied thereto a closure consisting of a top 3 and a skirt 4. The particular closure selected for carrying the invention into effect has its skirt provided with corrugations, as 5, the locking of the closure to the jar being effected by pressure applied to the corrugation which forces the metal between them into locking engagement with the shoulder formed by the rib or bead 2.

The closure employed for carrying the invention into effect, whatever be its form, will be made of sheet metal which can be stamped to form, thereby securing the requisite cheapness necessary to permit the closure to be thrown away after use, and should also be of such form as to enable it to be readily and quickly applied to the container by mechanical means, thereby insuring economy in the packaging operation. Such closures will further be of such a character as to be inherently flexible to a sufficient degree to enable them to yield to the pressures developed during the heating operation hereinafter referred to, thus permitting the escape of air without breaking the lock by which the seal is originally established. It has been found in practice that sheet metal of the character known as "taggers tin" which has a thickness of about .0075 in. is well adapted for the manufacture of closures for carrying the invention into effect, as closures made of this metal have sufficient resiliency to yield in the manner referred to during the heating operation to permit the escape of air and this without breaking the lock by which the seal is originally established. Such closures, whatever be their form in other respects, will be constructed so as to embrace or cover the mouth of the jar, thus preventing bacterial contamination of the mouth of the jar after processing and during transportation. Closures employed for carrying the invention into effect will further be provided with a gasket which is interposed between the mouth of the jar and the top of the closure. This gasket will be of substantially inelastic or non-resilient material. It has been found in practice that a disk of compressed paper coated with paraffin is well adapted for the purpose, such as shown in the drawing and marked 6.

The container employed in carrying the invention into effect should, to avoid waste during the heating operation, be provided with a suitable indicating mark, as 7. This mark should be so related to the mouth of the jar that after the jar is filled to said mark and subjected to heat, the expansion of the contents, under the temperature employed, will be just sufficient to fill the jar level full.

In carrying the invention into effect, the container is first filled up to the indicating mark, if such mark is employed, and the closure is then applied to the mouth of the jar and locked thereto, the closure, during this operation, being forced down so strongly against the mouth of the jar as to form a substantially hermetic seal. After this sealing operation the jar and its contents are subjected to heat applied in any suitable way, as by steam, or hot water. As the temperature of the contents of the jar increases, the contents expand and the air contained in the jar between the level of the contents and the under side of the gasket is compressed. After the heating has proceeded for a time, it will be found that the air is escaping slowly from the jar. If the heating be effected by submerging the jar in hot water the escape of the air may readily be noted by the bubbles which rise through the water from the top of the jar. If milk is being packaged, the temperature will ordinarily, as has been pointed out, not be allowed to much exceed 160° F., but it will be found that the escape of air begins considerably before this temperature is reached.

When large closures are employed, such, for instance, as those of the size illustrated in the drawings, it has been found, in practical operation, that the top of the cap becomes slightly convex or bulging, as in Fig. 2, in which the escape of air is indicated by the arrows. After, however, the heating operation is completed, and the container and its contents allowed to cool, it is found that the top of the closure becomes slightly concave, as indicated in Fig. 3. When closures of a smaller size are employed, the variations in form of the top of the closure are not noticeable. In any case, however, it will be found, provided the packaging has been carried out in the manner described, that after cooling a substantial vacuum exists between the under side of the cap and the top of the contents in the jar which have resumed their original level.

A closure of the character referred to, that is, one having corrugations in its skirt, is regarded as particularly advantageous for the practice of the invention, for the reason that these corrugations not only afford a means for securing a reliable seal, but also, inasmuch as the metal which forms the outer ribs of the corrugations stands away from the shoulder of the container, a number of small channels are formed which facilitate the escape of the air.

It will be understood that the process is not limited to the specific closure which has been heretofore described, though, as has been pointed out, this closure has produced in practice highly satisfactory results. This closure resembles in configuration the well-known "crown cork". A distinguishing characteristic which it possesses and which is not found in the crown cork is the inherent flexibility referred to which permits the cap to yield sufficiently during the heating or processing operation to allow the escape of air from the receptacle. It may be remarked that the crown cork has been largely employed for sealing beer bottles which are processed in tanks of hot water. The crown cork, however, requires to be sufficiently strong and rigid so as not to permit any escape of air or gas from the beer or other bottles during the processing operation, notwithstanding the fact that considerable initial pressure is developed in the bottles during the processing operation and exists in the bottles after processing by reason of the fermentation.

The process which has been described is particularly applicable to the packaging of milk and similar products on account of the celerity with which it may be carried out. It will be observed that it is unnecessary to sterilize either the containers, closures or gaskets prior to the placing of the contents in the containers, as the harmful bacteria which may have accumulated on these parts will be destroyed during the processing of the contents of the containers. Further, the character of the closure employed prevents bacterial contamination of the mouth of the receptacle after the processing operation, especially during transportation, so that a clean surface is always maintained over which the contents of the receptacle is poured. Further, the process is well-adapted for use in dairies and other places where milk is bottled, because of the simplicity of the operations incident to its practice. Where the process is carried out in the manner described, further, the purchaser of the milk can be certain that the package has not been tampered with after sealing, as the existence of the vacuum, which can be readily determined, shows that the package has not been opened after having been originally sealed.

What is claimed is:—

The process of packaging milk or similar products which are to be heated to destroy harmful bacteria, consisting in filling the container to such a level that the contents during heating will substantially fill the container, applying thereto a metal closure containing a substantially non-elastic sealing gasket and having a skirt which covers and protects the mouth of the container, so as to form with the mouth of the container a substantially hermetic seal, said closure being inherently sufficiently flexible to yield to the pressure developed within the container by the heat employed to permit the escape of air from the container and to re-establish the seal as the container is cooled, subjecting the container thus sealed to heat whereby the harmful bacteria are destroyed, the contents of the container are caused to expand and the air is expelled, and then cooling the container.

In testimony whereof, I have hereunto set my hand, in the presence of two subscribing witnesses.

HARVEY COALE.

Witnesses:
 HOWARD D. ADAMS,
 JAMES Q. RICE.